(12) United States Patent
Seitner et al.

(10) Patent No.: US 12,728,779 B2
(45) Date of Patent: Sep. 8, 2026

(54) FUNCTION-ADAPTED THREE-DIMENSIONAL FOAM STRUCTURE

(71) Applicant: Dr. Ing. h.c. F. Porsche Aktiengesellschaft, Stuttgart (DE)

(72) Inventors: Rainer Seitner, Vienna (AT); Ulrich Aschenbrenner, Vienna (AT); Max Pieper, Erfurt (DE); Volker Sieber, Karlsbad (DE); Carsten Frank, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 272 days.

(21) Appl. No.: 18/378,280

(22) Filed: Oct. 10, 2023

(65) Prior Publication Data

US 2024/0123884 A1 Apr. 18, 2024

(30) Foreign Application Priority Data

Oct. 13, 2022 (DE) ..................... 10 2022 126 734.2

(51) Int. Cl.
*B60N 2/70* (2006.01)
*B60N 2/02* (2006.01)
(Continued)

(52) U.S. Cl.
CPC ......... *B60N 2/7035* (2013.01); *B60N 2/0284* (2013.01); *B60N 2/16* (2013.01);
(Continued)

(58) Field of Classification Search
CPC .. B60N 2/7035; B60N 2/7029; B60N 2/0284; B60N 2002/0288
See application file for complete search history.

(56) References Cited

U.S. PATENT DOCUMENTS 6,601,918 B2 * 8/2003 Mattsson ............... B60N 2/666 297/410
9,708,067 B2 * 7/2017 Wilson ............... B64D 11/0647
(Continued)

FOREIGN PATENT DOCUMENTS

CN 109063297 A 12/2018
DE 102009012900 A1 * 9/2010 ........... B60N 2/0224
(Continued)

OTHER PUBLICATIONS

German Search Report dated May 4, 2023.

*Primary Examiner* — Timothy J Brindley
(74) *Attorney, Agent, or Firm* — LEYDIG, VOIT & MAYER, LTD.

(57) ABSTRACT

A function-adapted three-dimensional foam structure (2) for a vehicle seat (4) has first foam structure planes (6) to ensure a constant compressive strength of the foam structure (2) in two spatial directions x, y, second foam structure planes (8) to ensure a length variance of the foam structure (2) in a spatial direction z, that is perpendicular to the spatial directions x and y. The first foam structure planes (6) and the second foam structure planes (8) are formed and distributed within the foam structure (2) such that the compressive strength of the foam structure (2) is constant in the spatial directions x, y independent of the length-wise expansion of the foam structure (2) in the spatial direction z.

13 Claims, 5 Drawing Sheets

(51) Int. Cl.

| | |
|---|---|
| ***B60N 2/16*** | (2006.01) |
| ***B60N 2/809*** | (2018.01) |
| ***B60N 2/838*** | (2018.01) |
| *B33Y 80/00* | (2015.01) |

(52) U.S. Cl.

CPC ........... *B60N 2/7017* (2013.01); *B60N 2/809* (2018.02); *B60N 2/838* (2018.02); *B33Y 80/00* (2014.12)

(56) References Cited

U.S. PATENT DOCUMENTS

| | | | | |
|---|---|---|---|---|
| 9,764,661 | B2 * | 9/2017 | Hansen ................ | B60N 2/0284 |
| 10,398,236 | B2 * | 9/2019 | Achten ................. | B29C 64/209 |
| 10,696,546 | B1 * | 6/2020 | Perahia ................... | G01P 1/023 |
| 11,279,274 | B1 * | 3/2022 | Selvasekar ............... | B60N 2/80 |
| 11,319,075 | B1 * | 5/2022 | Malecha .............. | B60N 2/0284 |
| 11,820,258 | B2 * | 11/2023 | Bahr ...................... | A47C 3/021 |
| 11,945,139 | B2 * | 4/2024 | Escowitz .............. | B29C 43/003 |
| 2010/0071136 | A1 * | 3/2010 | Weber ................. | B29C 44/5627 156/251 |
| 2010/0330330 | A1 * | 12/2010 | Luca ................... | B29C 44/5654 428/137 |
| 2017/0043695 | A1 | 2/2017 | Kitamoto et al. | |
| 2021/0259425 | A1 * | 8/2021 | Michalak ............... | B33Y 50/00 |
| 2022/0024364 | A1 | 1/2022 | Itabashi | |
| 2022/0177138 | A1 | 6/2022 | Hallford et al. | |
| 2023/0219474 | A1 | 7/2023 | Maloney et al. | |

FOREIGN PATENT DOCUMENTS

| | | | | |
|---|---|---|---|---|
| DE | 102017122183 | | 3/2019 | |
| DE | 102020130583 | | 6/2022 | |
| WO | WO-2020127810 | A1 * | 6/2020 | ............... B60N 2/28 |

* cited by examiner

FUNCTION-ADAPTED THREE-DIMENSIONAL FOAM STRUCTURE

CROSS REFERENCE TO RELATED APPLICATION

This application claims priority on German Patent Application No 10 2022 126 734.2 filed Oct. 13, 2022, the entire disclosure of which is incorporated herein by reference.

BACKGROUND

Field of the Invention

The invention relates to a function-adapted three-dimensional foam structure for use in a vehicle seat, a vehicle seat comprising such a foam structure, as well as a method of producing a function-adapted three-dimensional foam structure.

Related Art

Foam structures for use in a vehicle seat are known in the prior art and are used to ensure a high sitting comfort. To this end, the composition and distribution of a foam structure must be chosen to be reversibly compressible within certain limits, i.e. when pressure is applied to the foam structure, the foam structure is reversibly compressible to a certain extent. This property of a foam can be quantified using the compressive strength of a foam. The compressive strength is generally indicated in Pa or kPa and states how much pressure must be applied to a foam to compress the foam by, for example, 65%, 40%, or 25% of the starting height. A higher compressive strength indicates a firmer foam. Seat components also should allow great freedom with regard to adjustability so that the seat components can provide a targeted adjustment to individual physical conditions.

Disadvantageously, the foam structures can be difficult to adjust to the variable positioning of the seat components. Thus, for example, in the case of a length adjustment of a seat middle web or a headrest of a vehicle seat with a foam structure, there necessarily occurs undesirable thinning or bulging of the foam structure, which in turn massively changes the compressive strength of the foam structure.

Therefore, a problem addressed by this invention is to at least partially remedy the disadvantages described above. In particular, a problem addressed by the invention is to provide a three-dimensional foam structure for a vehicle seat that offers a high user comfort while being simple and cost-efficient to produce.

Technical features that are disclosed herein regarding the foam structure also apply to the vehicle seat and the method of making the foam structure, and vice versa, so that reference is or can always be made mutually with respect to the disclosure regarding the individual aspects of the invention.

SUMMARY OF THE INVENTION

One aspect of the invention relates to a function-adapted three-dimensional foam structure for use in a vehicle seat. In some embodiments, the foam structure is made via a 3D printing method. The foam structure comprises first foam structure planes to ensure a constant compressive strength of the foam structure in two spatial directions x, y, and second foam structure planes to ensure a length variance of the foam structure in a spatial direction z. The spatial direction z is perpendicular to the spatial directions x and y, and the first foam structure planes and the second foam structure planes are formed and distributed within the foam structure such that the compressive strength of the foam structure is constant in the spatial directions x, y independent of the length-wise expansion of the foam structure in the spatial direction z.

By contrast to the known foam structures for use in a vehicle seat, this disclosure provides a combination of plural first foam structure planes to ensure a constant compressive strength and plural second foam structure planes to ensure a length variance, thereby providing a targeted adjustment of foam structure properties to desired comfort requirements of a vehicle seat. The arrangement disclosed herein achieves a high variability of the foam structure in one spatial direction, but a compressibility or compressive strength purposefully is kept constant in two other spatial directions. In one aspect of the invention addition, the function-adapted three-dimensional foam structure is produced via a 3D printing method.

The function-adapted, three-dimensional foam structure described herein can be used in vehicle seats of cars or trucks. However, it is also conceivable to use the three-dimensional foam structure in seats of other vehicles or stationary objects.

Functional adaptation can be understood in the context of the invention to mean a targeted adjustment of the structure to a desired function. In the context of the invention, a spring accumulator or a spring accumulator constant can be understood as the compressive strength. When using the foam structure of the invention in a vehicle seat, the spatial direction z can represent the spatial direction of an adjustment direction of the seat, and the spatial directions x and y are transverse or perpendicular to the adjustment direction. Thus, the foam structure can have a length-independent spring accumulator across or perpendicular to a direction of adjustment due to the arrangement of planes with a spring accumulator property in combination with the arrangement of planes with a length accumulator property. Thus, the foam structure disclosed herein enables an adaptive length change in the direction of adjustment without changing a spring accumulator unit and thus can prevent thinning or bulging in case of a length variation. It should be understood that a constant compressive strength can also be understood to mean minor deviations of the compressive strength of less than 10%, preferably less than 5%, in particular less than 1%. It will further be appreciated that the spatial directions x, y, z can be understood, as part of a consideration of a foam structure within a three-dimensional coordinate system, to be the negative spatial directions −x, −y, −z. Polymers such as quick-drying polymers or polymer resins or mixtures of different polymers or polymer resins are considered as materials for the production of the foam structures of the invention.

The first foam structure planes and the second foam structure planes may be present in the foam structure in an equal number or amount to achieve a particularly exact and targeted adjustable structure property. In some embodiments, the first foam structure planes and second foam structure planes are arranged to alternate with one another in the foam structure. An alternating distribution of the first and second foam structure planes allows for a distribution of force as homogeneously as possible with respect to a length variance and a compressive strength.

Sufficient length expandability of the foam structure can be achieved by having the first foam structure planes and second foam structure planes formed and distributed within the foam structure such that the length variance of the foam structure in the spatial direction z is at least 3 times, preferably at least 5 times, in particular at least 10 times the length variance of the foam structure in the spatial directions x or y.

Sufficient compressive strength of the foam structure may be achieved by having the first and second foam structure planes formed and distributed within the foam structure such that the compressive strength of the foam structure in the spatial directions x and y is at least 3 times, preferably at least 5 times, in particular at least 10 times the compressive strength of the foam structure in the spatial direction z.

A particularly homogeneously distributed compressive strength along the surface of a foam structure may be achieved by having the first foam structure planes and second foam structure planes formed and distributed within the foam structure such that the foam structure compressive strength varies perpendicular to the spatial direction z by less than 3%, preferably less than 2%, in particular less than 1%.

The invention also relates to a vehicle seat for use in a motor vehicle. The vehicle seat may comprise a seat structure for use in a motor vehicle with a seat middle web, side wings arranged to the left and to the right of the seat middle web, and a headrest arranged above the seat middle web. The vehicle seat has a function-adapted three-dimensional foam structure as described above. The vehicle seat thus has the same advantages as already extensively described with respect to the foam structure.

Increased user comfort of a vehicle seat can be achieved when the seat structure comprises an extended adjustment region. The extended adjustment region of the seat structure may comprise a length adjustability of the seat middle web and/or a height adjustability of the headrest and/or a tilt adjustability of the headrest.

The seat structure may have a height adjustability of at least 5 cm, preferably at least 10 cm, in particular at least 13 cm and/or a backrest reclinability of at least 5°, preferably at least 8°, in particular at least 11°.

A high user comfort can be provided if the seat structure has a distance override capability in the seat middle web and/or between the side wings and the headrest.

The invention also relates to a method for producing a function-adapted three-dimensional foam structure for use in a vehicle seat, such as the foam structure described above. The method comprises the steps of selecting a desired compressive strength and length variance of the foam structure along the spatial directions x, y, z; simulating a construction and composition of the foam structure from plural first foam structure planes to ensure a constant compressive strength of the foam structure in two spatial directions x, y and plural second foam structure planes to ensure a length variance of the foam structure in a spatial direction z; producing the foam structure based on the simulation. The method according to the invention thus has the same advantages as already described with respect to the foam structure and the vehicle seat.

The invention described herein provides a simple, fast, inexpensive, and purposefully adaptable product that can be produced by a 3D printing method.

Further advantages, features, and details of the invention arise from the following description, in which examples of the invention are described in detail with reference to the drawings. The features mentioned in the claims and in the description can be essential for the invention individually or in any combination.

DETAILED DESCRIPTION

Figure 1:
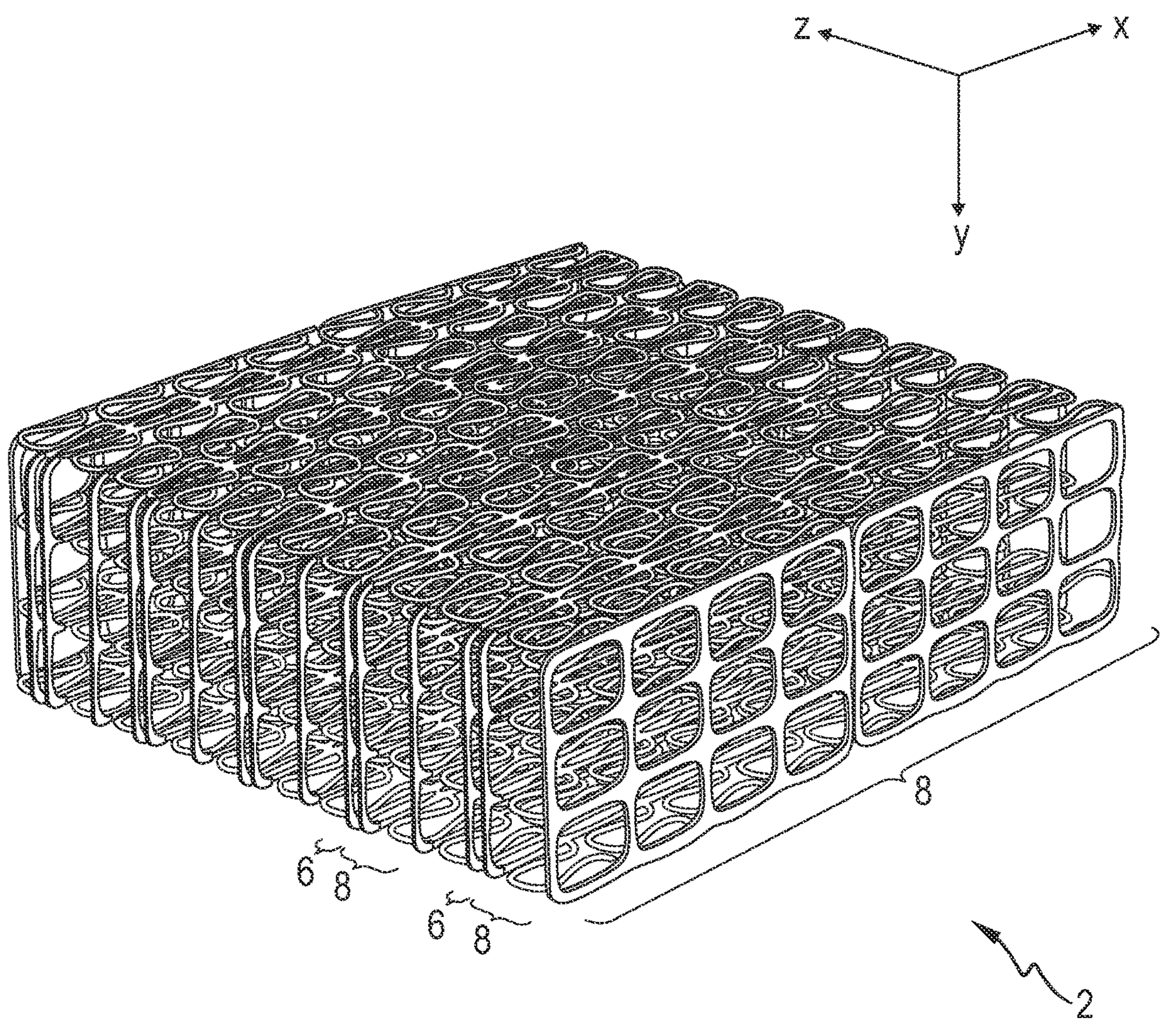
FIG. 1 is a function-adapted three-dimensional foam structure according to a first embodiment.

FIG. 1 shows a function-adapted three-dimensional foam structure 2 according to a first embodiment.

The foam structure 2 of FIG. 1 comprises first foam structure planes 6 to ensure a constant compressive strength of the foam structure 2 in two spatial directions x, y as well as second foam structure planes 8 to ensure a length variance of the foam structure 2 in a spatial direction z. The spatial direction z is perpendicular to the spatial directions x and y. The first foam structure planes 6 and second foam structure planes 8 are formed and distributed within the foam structure 2 such that the compressive strength of the foam structure 2 in the spatial directions x, y is constant independent of the length-wise expansion of the foam structure 2 in the spatial direction z.

The first foam structure planes 6 and the second foam structure planes 8 can be present in the foam structure 2 in the same number or amount and can be arranged to alternate with one another in the foam structure 2.

The first foam structure planes 6 and the second foam structure planes 8 can further be formed and distributed within the foam structure 2 such that the length variance of the foam structure 2 in the spatial direction z is at least 3 times, preferably at least 5 times, in particular at least 10 times the length variance of the foam structure 2 in the spatial directions x or y.

Likewise, the first foam structure planes 6 and the second foam structure planes 8 can be formed and distributed within the foam structure 2 such that the compressive strength of the foam structure 2 in the spatial directions x and y is at least 3 times, preferably at least 5 times, in particular at least 10 times the compressive strength of the foam structure 2 in the spatial direction z.

Furthermore, the first foam structure planes 6 and the second foam structure planes 8 can be formed and distributed within the foam structure 2 such that the compressive strength of the foam structure 2 perpendicular to the spatial direction z varies by less than 3%, preferably less than 2%, in particular less than 1%.

Figure 2:
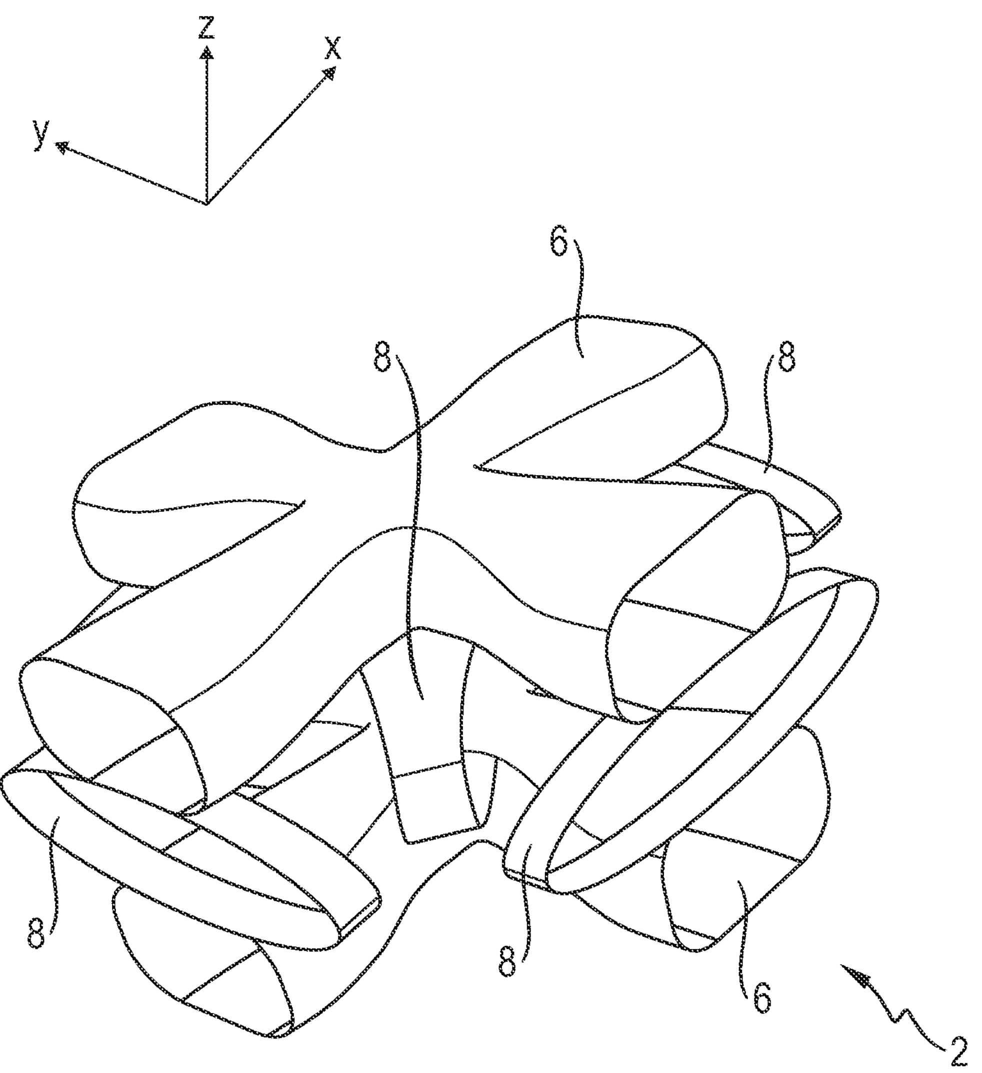
FIG. 2 is a partial section of a function-adapted three-dimensional foam structure according to a second embodiment.

FIG. 2 shows a partial section of a function-adapted three-dimensional foam structure 2 of a second embodiment, in which the first foam structure planes 6 are arranged to ensure a constant compressive strength of the foam structure 2 in two spatial directions x, y, as well as, a second foam structure plane 8 to ensure a length variance of the foam structure 2 in a spatial direction z.

Figure 3:
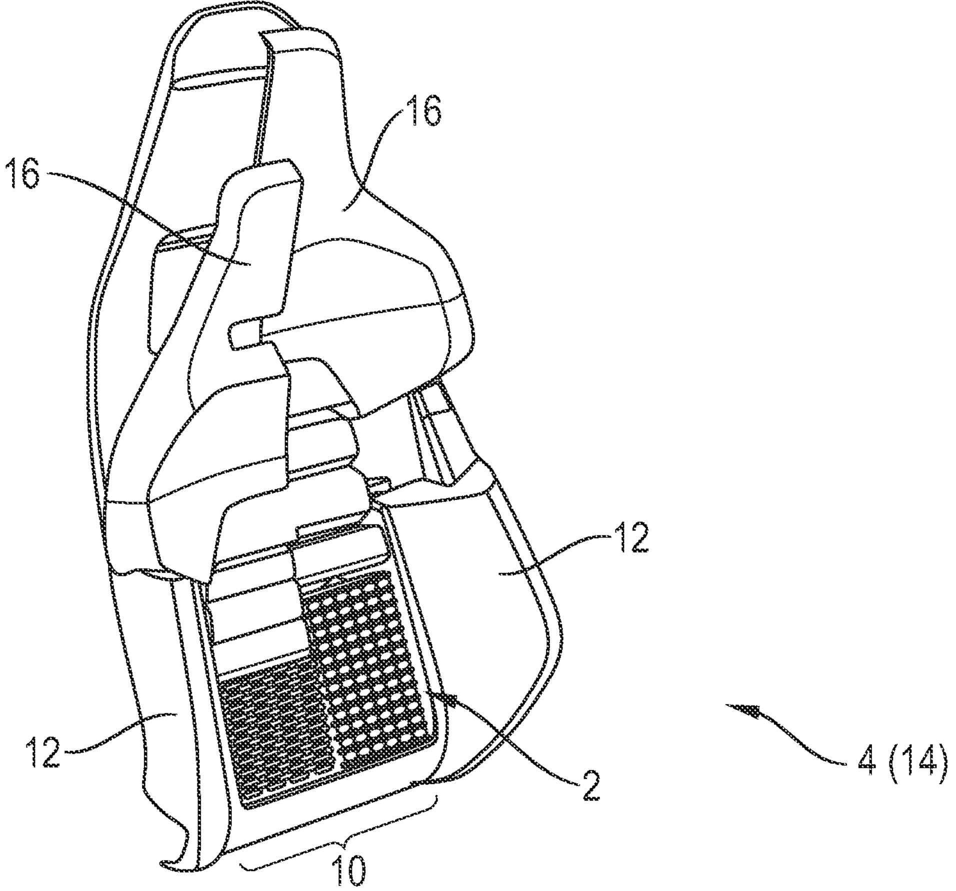
FIG. 3 is a vehicle seat having a function-adapted three-dimensional foam structure according to a first embodiment.

FIG. 3 shows a first embodiment of a vehicle seat 4 with a function-adapted three-dimensional foam structure 2. The vehicle seat 4 of FIG. 3 comprises a seat structure 14 for use in a motor vehicle with a seat middle web 10, side wings 12 arranged respectively to the left and right of the seat middle web 10, and a headrest 16 above the seat middle web 10. The vehicle seat 4 has a function-adapted three-dimensional foam structure 2.

Figure 4:
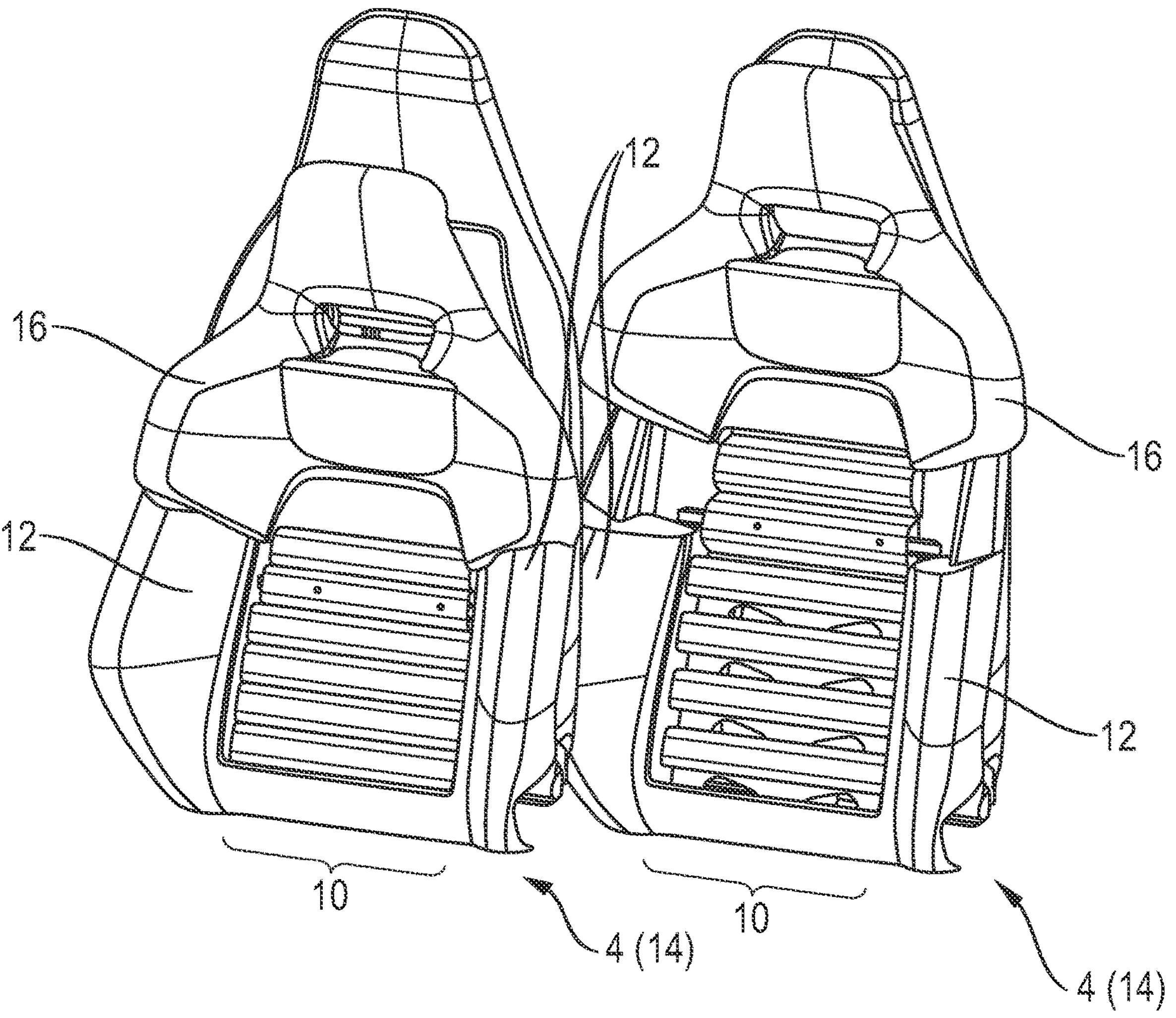
FIG. 4 shows the vehicle seat of FIG. 3 in a first position (left) and a second position (right).

FIG. 4 shows the vehicle seat of FIG. 3 in a first position (left) and a second position (right). The seat structure 14 of FIG. 4 has an extended adjustment region that comprises a length adjustability of the seat middle web 10, a height adjustability of the headrest 16, a tilt adjustability of the headrest 16, and a distance override capability in the seat middle web 10 in the side wings 12 and in the headrest 16.

Figure 5:
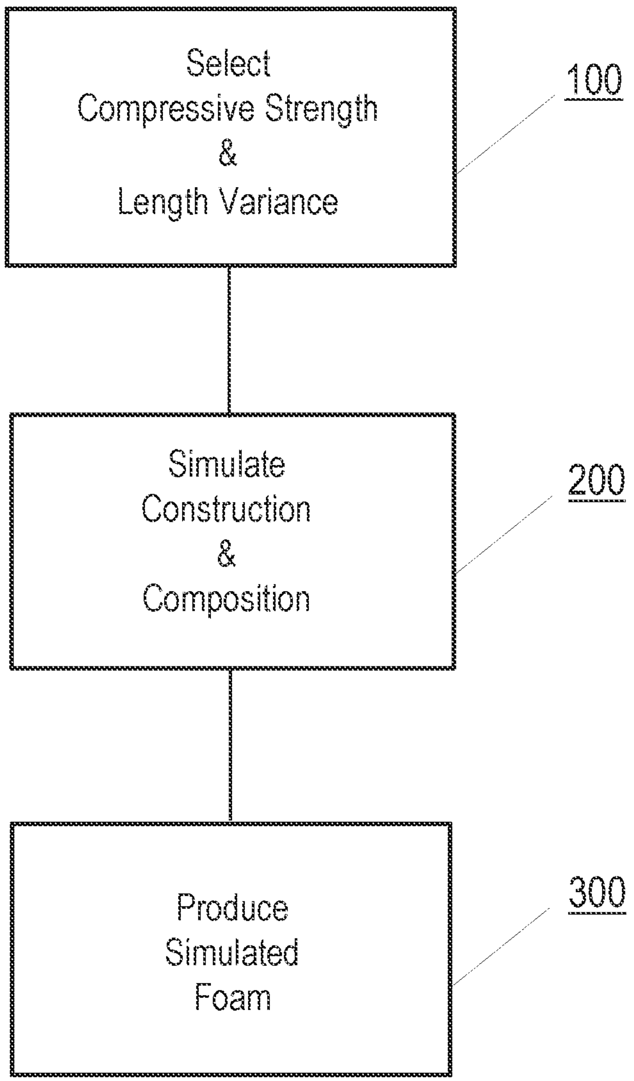
FIG. 5 schematically illustrates the steps of a method for producing a function-adapted three-dimensional foam structure for use in a vehicle seat.

FIG. 5 shows the individual steps of a method according to the invention for producing a function-adapted three-dimensional foam structure for use in a vehicle seat. The method of FIG. 5 comprises a first step 100 of selecting a desired compressive strength and length variance of the foam structure 2 along the spatial directions x, y, z. The method proceeds with a step 200 for simulating a construction and a composition of the foam structure 2 from a plurality of first foam structure planes 6 to ensure a constant compressive strength of the foam structure 2 in two spatial directions x, y and a plurality of second foam structure planes 8 to ensure a length variance of the foam structure 2 in a spatial direction z. The method then includes a step 300 of producing the foam structure 2 based on the simulation of the step 200.

The production 300 of the foam structure 2 in the step 300 can be carried out via a 3D printing method.

The above explanation describes the invention solely in the context of examples. Of course, if technically useful, individual features of the embodiments can be combined freely with one another without departing the scope of the invention.

The invention claimed is:

1. A function-adapted three-dimensional foam structure for a vehicle seat comprising:

plural planar first foam structures configured to ensure a constant compressive strength of the foam structure in a spatial direction x and a constant compressive strength of the foam structure in a spatial direction y; and plural planar second foam structures configured to ensure a length variance of the foam structure in a spatial direction z, wherein the spatial direction z is perpendicular to the spatial directions x and y, and the plural planar first foam structures and the plural planar second foam structures are formed and distributed within the foam structure such that a compressive strength of the foam structure is constant in the spatial directions x, y independent of a length-wise expansion of the foam structure in the spatial direction z.

2. The three-dimensional foam structure of claim 1, wherein the planar first foam structures and the planar second foam structures are formed and distributed within the foam structure such that a length variance of the foam structure in the spatial direction z is at least 3 times a length variance of the foam structure in the spatial directions x or y.

3. The three-dimensional foam structure of claim 1, wherein the planar first foam structures and the planar second foam structures are formed and distributed within the foam structure such that a compressive strength of the foam structure in the spatial directions x and y is at least 3 times the compressive strength of the foam structure in the spatial direction z.

4. The three-dimensional foam structure of claim 1, wherein the planar first foam structures and the planar second foam structures are formed and distributed within the foam structure such that a compressive strength of the foam structure perpendicular to the spatial direction z varies by less than 3%.

5. A vehicle seat with a seat structure comprising:

a seat middle web;

left and right side wings arranged respectively on left and right sides of the seat middle web; and a headrest arranged above the seat middle web, wherein the vehicle seat includes the three-dimensional foam structure of claim 1.

6. The vehicle seat of claim 5, wherein the seat structure comprises an extended adjustment region configured to provide length adjustability of the seat middle web and/or a height adjustability of the headrest and/or a tilt adjustability of the headrest.

7. The vehicle seat of claim 5, wherein the seat structure has a height adjustability of at least 5 cm and/or a backrest reclinability of at least 5°.

8. A method for producing the three-dimensional foam structure of claim 1 for a vehicle seat, the method comprising the steps of:

selecting a desired compressive strength and length variance of the foam structure along the spatial directions x, y, z, simulating a construction and composition of the foam structure from a plurality of first foam structure planes to ensure a constant compressive strength of the foam structure in two spatial directions x, y and a plurality of second foam structure planes to ensure a length variance of the foam structure in a spatial direction Z, producing the foam structure based on the simulation.

9. The method of claim 8, wherein the production of the foam structure is carried out via 3D printing.

10. A function-adapted three-dimensional foam structure for a vehicle seat comprising:

plural planar first foam structures configured to ensure a constant compressive strength of the foam structure in a spatial direction x and a constant compressive strength of the foam structure in a spatial direction y; and plural planar second foam structures configured to ensure a length variance of the foam structure in a spatial direction z, wherein the spatial direction z is perpendicular to the spatial directions x and y, and the plural planar first foam structures and the plural planar second foam structures are formed and distributed within the foam structure such that a compressive strength of the foam structure is constant in the spatial directions x, y independent of a length-wise expansion of the foam structure in the spatial direction z, wherein the planar first foam structures and the planar second foam structures are present in the foam structure in equal numbers, and wherein the planar first foam structures and the planar second foam structures are arranged to alternate with one another in the foam structure.

11. The three-dimensional foam structure of claim 10, the planar first foam structures and the planar second foam structures are formed and distributed within the foam structure such that a length variance of the foam structure in the spatial direction z is at least 3 times a length variance of the foam structure in the spatial directions x or y.

12. The three-dimensional foam structure of claim 11, wherein the planar first foam structures and the planar second foam structures are formed and distributed within the foam structure such that a compressive strength of the foam structure in the spatial directions x and y is at least 3 times a compressive strength of the foam structure in the spatial direction z.

13. The three-dimensional foam structure of claim 12, wherein the planar first foam structures and the planar second foam structures are formed and distributed within the foam structure such that a compressive strength of the foam structure perpendicular to the spatial direction z varies by less than 3%.

* * * * *